(12) United States Patent
Tsur et al.

(10) Patent No.: US 11,372,139 B2
(45) Date of Patent: Jun. 28, 2022

(54) METHOD AND APPARATUS FOR PROJECTING CONTENT DISPLAYED ON A DISPLAY

(71) Applicant: PhoneOptika Ltd, Sde Warburg (IL)

(72) Inventors: Shraga Tsur, Tel Aviv (IL); Arie Heiman, Sde Warburg (IL)

(73) Assignee: PHONEOPTIKA LTD, Sde Warburg (IL)

( * ) Notice: Subject to any disclaimer, the term of this patent is extended or adjusted under 35 U.S.C. 154(b) by 0 days.

(21) Appl. No.: 16/865,284

(22) Filed: May 1, 2020

(65) Prior Publication Data
US 2020/0363564 A1 Nov. 19, 2020

Related U.S. Application Data

(60) Provisional application No. 62/842,539, filed on May 3, 2019.

(51) Int. Cl.
*G02B 3/00* (2006.01)
(52) U.S. Cl.
CPC .......... *G02B 3/0056* (2013.01); *G02B 3/0062* (2013.01)
(58) Field of Classification Search
CPC .. G02B 3/0068; G02B 3/0075; G02B 3/0062; G02B 27/0101; G02B 2027/0147; G02B 27/025; G02B 3/0056; G03B 13/24; G03B 13/26; G03B 21/625
See application file for complete search history.

(56) References Cited

U.S. PATENT DOCUMENTS

| | | | |
|---|---|---|---|
| 5,973,844 A * | 10/1999 | Burger | G02B 3/0056 359/622 |
| 10,359,640 B2 * | 7/2019 | Powell | G02B 30/56 |
| 2015/0085259 A1 * | 3/2015 | Schreiber | G02B 27/0101 353/30 |

* cited by examiner

*Primary Examiner* — Alicia M Harrington
(74) *Attorney, Agent, or Firm* — Reches Patents (57) ABSTRACT

An apparatus for projecting content displayed on a display, the apparatus may include a first array of first microlenses that comprise multiple first microlenses; a second array of second microlenses that is spaced apart from the first array of microlenses and comprises multiple second microlenses; wherein a width of each first microlens and each second microlens is smaller than a few times a pixel pitch of the display; wherein the second array of second microlenses is located at a conjugate plane of the display; wherein a focal plane of each second microlenses is located at a corresponding first microlens; wherein the apparatus is configured to project different images of the display that are located at different distances from the display; wherein each image of the display comprises multiple image segments; wherein an optical path of each image segment passes through a dedicated pair of a second microlens and a corresponding first microlens.

19 Claims, 7 Drawing Sheets

Projecting, by an apparatus, different planes that differ from each other and are located at a vicinity of focal planes of a second microlenses of a second array of second microlenses of the apparatus; wherein the apparatus further comprises a first array of first microlenses, wherein the second array of second microlenses is spaced apart from the first array of first microlenses, wherein a width of each first microlens and each second microlens is smaller than a few times a pixel pitch of the display, wherein the second array of second microlenses is located at a conjugate plane of the display, wherein a focal plane of the second microlenses is located at the first microlens; wherein each plane bears visual information that comprises multiple segments; and wherein an optical path of each segment passes through a dedicated pair of a second microlens and a corresponding first microlens. 310

METHOD AND APPARATUS FOR PROJECTING CONTENT DISPLAYED ON A DISPLAY

CROSS REFERENCE

This application claims the priority of U.S. provisional patent 62/842,439 filing date May 3, 2019 which is incorporated herein by reference.

BACKGROUND

Today, digital displays are very popular. They are used in mobile phones, smart phones, wearable devices, tablets, computers, cars, digital camera, TV, etc. However, in some cases, the user encounters challenges that significantly reduce his viewing experience.

Most people approaching 40 years old or above, lose the auto-focus capability of their eyes since their eye lenses lose their flexibility. The focus of their eyes remains fixed at a certain position thus, their clear vision is only at a certain distance: Most of them are "far-sighted" and see clearly the long distances ("Infinity") therefore need reading glasses to read at the short distances. Another part of them is "short-sighted" and see clearly at short distances, therefore, can read without glasses but need optical glasses for the long distances such as driving, watching TV, Cinema, etc.

To fix it, the "far-sighted" people are using reading glasses which enable them to focus on near objects. However, they do not need the eyeglasses to see images that are far. In typical scenarios, most of the day they don't wear eyeglass, hence it is very common that when people need to read a message from their digital display (mobile phone, Tablet, digital watch etc.) they need the reading glasses which are not available. This is very annoying as they need to look after their eyeglass. There are many people who prefer not to use reading eyeglasses in public. Providing the capability to read the digital display without eyeglass is very attractive for those people.

In addition—ophthalmologists warn about the effects of overuse of laptop computers, tablets, cell phones, and now Smartwatches on our vision. With the growing popularity of mobile devices, most of us spend more and more of our time interacting with the world on small glowing screens. There is a lot of evidence that while there are many benefits to having the world at our fingertips, spending too much time focusing up close may be harming our eyes. Evidence show that since the exponentially growing use of displays, especially by children, in recent decades, the percentage of children and adults that need glasses, has dramatically risen due to the fact that their eyes have been strained every day, by focusing their eyes on their displays at short distances, for long periods of time.

There is a growing need to provide a method and apparatus that significantly improves the user experience and reduces eye strain in the mentioned above cases.

SUMMARY

There may be provided an apparatus and method for projecting content displayed on a display.

The apparatus may include a first array of first microlenses that may include multiple first microlenses; a second array of second microlenses that may be spaced apart from the first array of first microlenses and may include multiple second microlenses; wherein a width of each first microlens and each second microlens may be smaller than a few times a pixel pitch of the display; wherein the second array of second microlenses may be located at a conjugate plane of the display; wherein a focal plane of the second microlenses may be located at the first microlens; wherein the apparatus may be configured to project different planes that differ from each other and may be located at a vicinity of focal planes of the second microlenses; wherein each plane bears visual information that may include multiple segments; and wherein an optical path of each segment passes through a dedicated pair of a second microlens and a corresponding first microlens.

The few times may be four times, may be less than four times or more than four.

The different planes may be located inside the depth of field of the second array of second microlenses.

Different pairs may have optical axes that may be not parallel to each other, wherein each pair may include a second microlens and a corresponding first microlens.

A distance between adjacent second microlenses may be smaller than a distance between corresponding adjacent first microlenses.

Different pairs may exhibit optical axes that intersect each other.

An area of a second microlens may be smaller than an area of a corresponding first microlens.

A ratio between a width (Dc2) of a second microlens and a width (Dc1) of a corresponding first microlens may substantially equal $L/(L+H1)$, wherein H1 may be a distance between the second microlens and the first corresponding micro lens, and wherein L may be distance between the display and an intersection point between optical axes of different pairs.

The apparatus may include at least one transparent element positioned between the first microlenses array and the second microlenses array.

There may be an air gap between the at least one transparent element and the first microlenses arrays.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

There are provided a method and an apparatus that may eliminate the need of using reading glass to read the content of a digital display.

This is done by adding an apparatus that may be shaped and sized as a thin film, on top of the display, which converts the image of the display to be conceived by the user eye as if it is far, at infinity for "far-sighted" and at near ranges for "near sighted" users thus, enabling the "far-sighted" and the "near sighted" users to view it at high resolution without the use of glasses. The method can be embedded as an additional thin layer of the display or can be used as an add-on transparent thin film or device, that covers the display.

The method and apparatus may be suited for both "far-sighted" and "near-sighted" eyes as well as for people that have perfect eye vision and do not need eyeglasses at all. With the proposed apparatus and method, the display will be visible at a high resolution for most eyes, and with no further eye correction is needed.

The method and apparatus may prevent the eye strain by providing the user of a display at the normal reading range (~25-40 cm) with its image at Infinity, with no noticeable changes in magnification, resolution, color, brightness and other display features.

The method and apparatus overcome the need to tailor the optics to the user focus capabilities to see far objects. In addition, the method and apparatus reduce the reflection of the sun and the background scene when the display is used outdoors on a sunny day.

Figure 1:
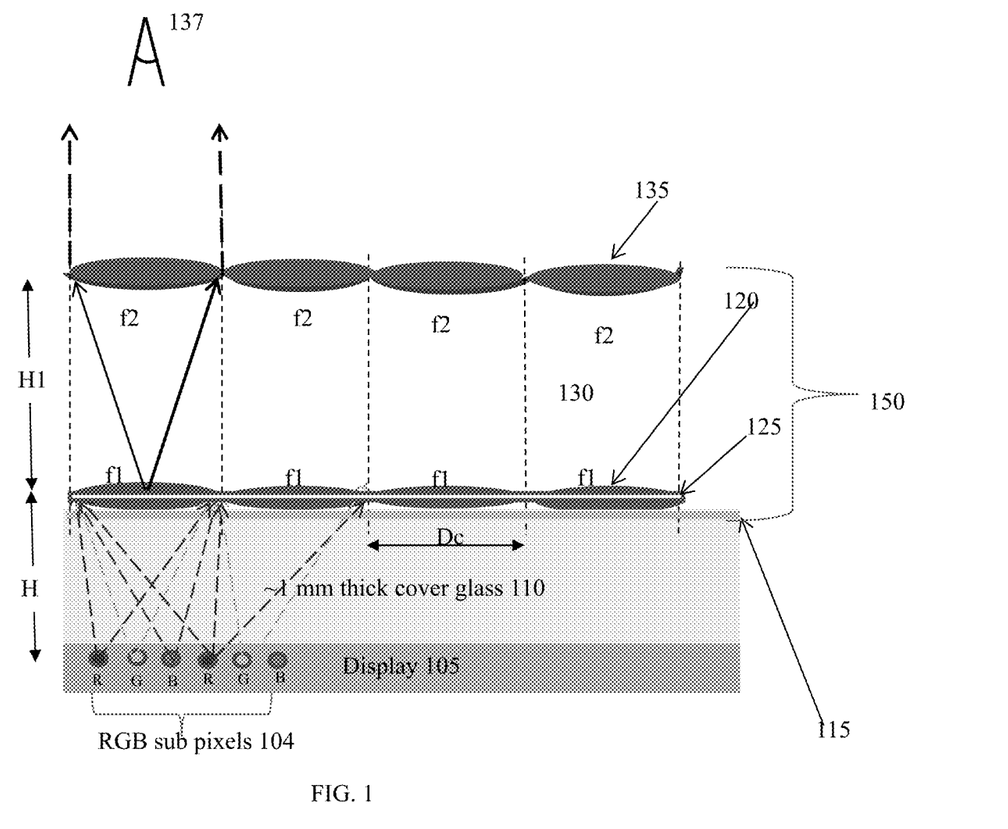
FIG. 1 is an example of one or more parts of an apparatus and of a display.
Figure 6:
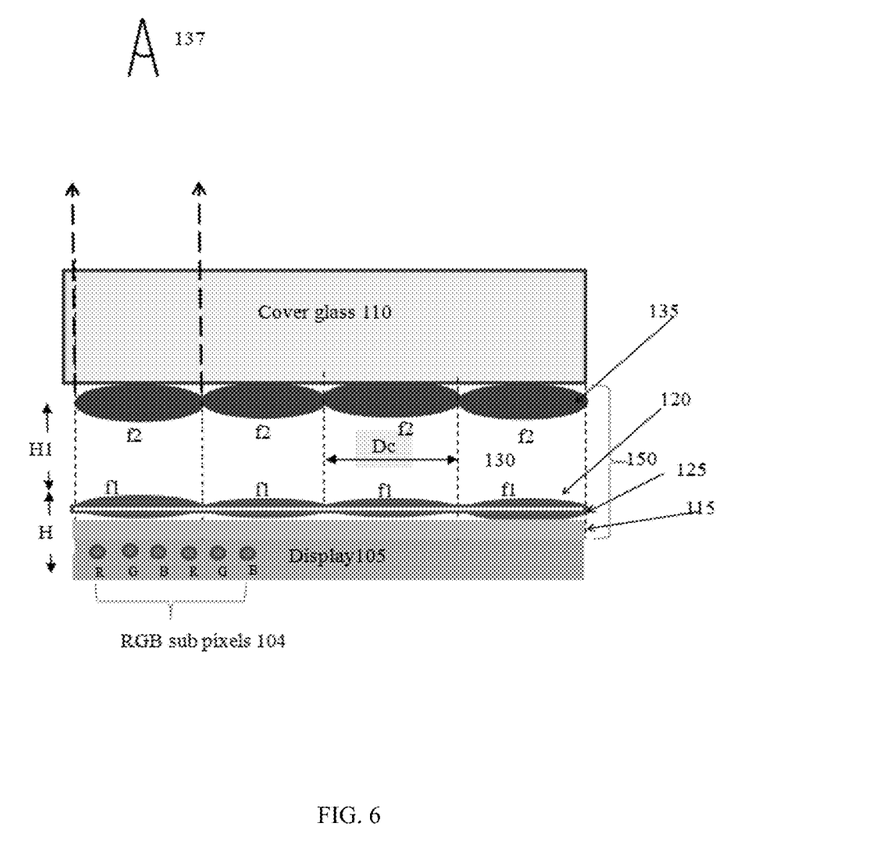

The apparatus may include a combination of different optical layers that can be embedded as a special thin film on top of the display as an add-on, see FIG. 1 or embedded as a special layer in the display, as an example see FIG. 6.

Figure 2:
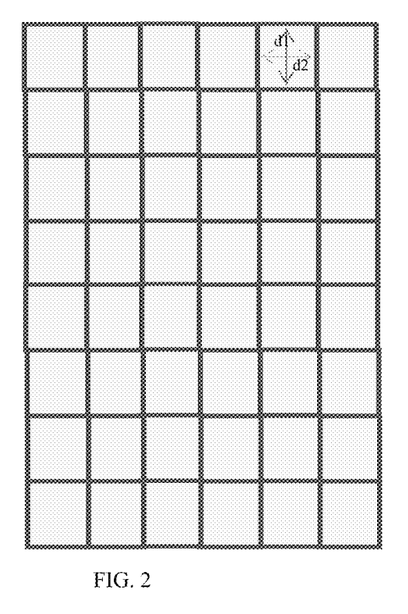
FIG. 2-2A is an example of one or more parts of an apparatus.
Figure 2A:
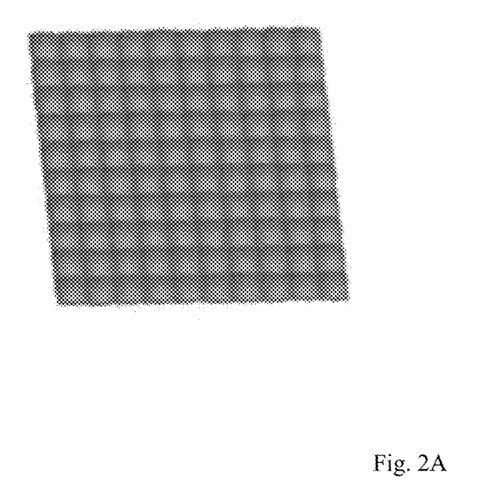

The thin layer is composed of 3D Micro Lens Array (MLA) layers, where its cross section depicted in FIG. 1. FIG. 2 and FIG. 2a presents an example of the upper view of a rectangular micro lens array. It should be noted that micro lenses of any shape that can fully cover the display area may be considered, such as arrays of triangles, rectangles, hexagonal etc. for simplicity of the description, we refer to the rectangular case.

Referring to FIG. 1, the digital display 105 is composed of a combination of an array of Red-R, Blue-B and Green-G colors sub pixels 104. Without a loss of generality and for simplicity, they are drawn along a line, but they may have any two-dimensional (2D) or three dimensional (3D) configuration. The linear combination of the relative intensities of the subpixels creates the actual color of the pixel. The pitch between the pixels depends on the resolution of the display. In today mobile phones the pitch is around 40-80 μm. The array of pixels is attached to a cover glass 110 where its typical optical thickness is about 0.5-1 mm.

This configuration is typical for the various types of digital displays. Our thin layer element 150 of FIG. 1, is attached to 110, it is composed as an example, of 4 layers as follows:

a. Layer 115 which may consist of index matching glue between the display and the cover glass which significantly, decreases the reflection from the cover glass and that of the next interface.

b. A $1^{st}$ Micro Lens Array (MLA) layer, 120, of width Dc1 and focal length f1. Preferably, Dc1 (the size of the cell of the MLA) is below the resolving power of the eye at a normal reading distance. Typically, Dc1 may be in the order of magnitude of pixel pitch of the display.

c. Intermediate transparent layer 130. It may comprise of a transparent solid layer or an air gap, for ease of production and to eliminate requirements for too small and un-producible radii of lenses. An air gap will assure a high difference in refractive index (Δn) across the interface with the lenses and thus larger, manufactural radii. Small and very thin posts, at part of the corners between some of the lenses may serve as spacers 132 see FIG. 3, at the expense of a negligible portion of the fill factor of the whole MLA.

d. A $2^{nd}$ MLA layer 135 with almost the same width Dc2 and focal length f2 that resides on layer 130. The focal plane of the $2^{nd}$ MLA lens is at the plane of the $1^{st}$ MLA lens 125 thus it projects its image to Infinity. The preferred relations between Dc1 and Dc2 will be explained later.

Figure 3:
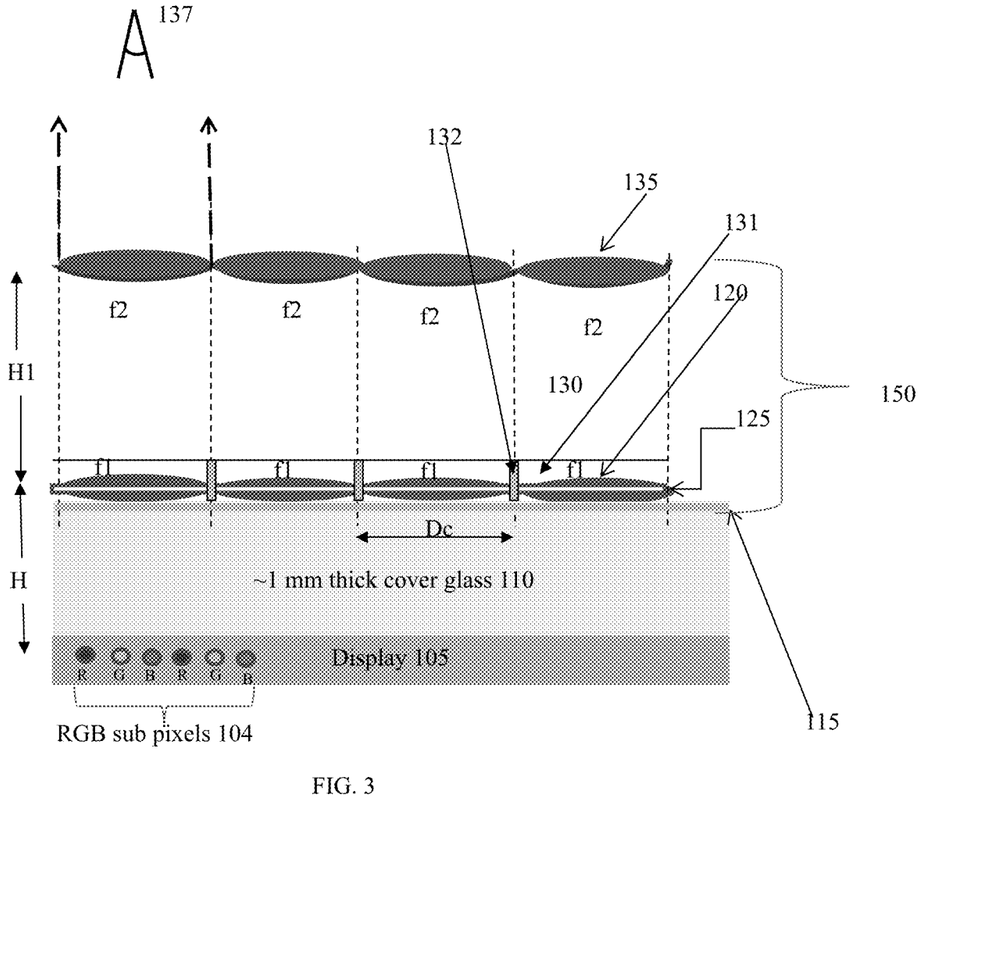
FIG. 3 is an example of one or more parts of an apparatus.

We call the configuration of FIG. 1 and FIG. 3 as an Aperture Image Dual Micro lens Array (AIDMLA).

Figures 4, 4A:
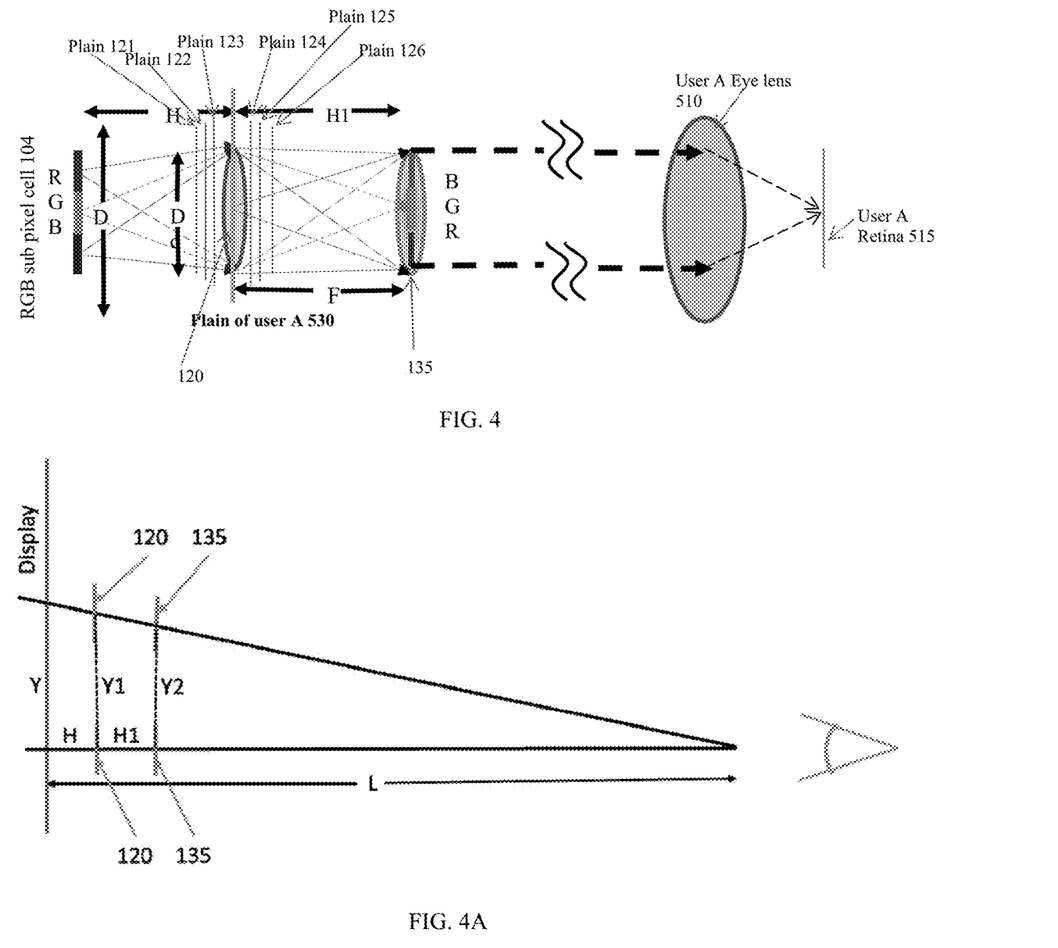
FIGS. 4, 4A, 5 and 6 are examples of one or more parts of an apparatus, of a display and of various optical paths.

Following is a short description of the proposed optical system for one MLA cell (see FIG. 4):

Each lens of the $1^{st}$ MLA 120, produces an image of a tiny portion of the display, of size D. This image is formed at the plane of the $2^{nd}$ lens 135 that is part of the $2^{nd}$ MLA. It is an inverted image of D with a magnification of: M=H1/H, that fills the $2^{nd}$ lens. The size of the imaged portion of the display is thus D=Dc2/M. For simplicity and with no loss of generality, H and H1 are the "optical thicknesses" of the materials, that include their refractive indices, respectively.

The $1^{st}$ lens 120 is at the focal plane of the $2^{nd}$ lens 135, along the optical axis thus, the image of the aperture of the $1^{st}$ lens 120 is projected to Infinity by the $2^{nd}$ lens. Every point of this image (of the aperture of the $1^{st}$ lens), receives light rays from every point of D on the display thus, it is a perfect blend of the RGB subpixels that constitute it. As Dc1 and Dc2 (the sizes of the lenses on both sides of the cell) are below the resolving power of the eye, the eye of an observer of the display, along the optical axis, will see a non-resolvable, tiny spot with the color of D on the display that is imaged onto his/her eye.

As indicated above, each cell images that small portion of the display, of size D, to infinity therefor, it emits parallel rays onto the eye. These rays are focused on the retina to a spot. As the size of the cell is much smaller than the input pupil of the eye (50-100 μm compared to 2-3 mm), several such parallel bundles of parallel rays, that origin from different areas on the display and are parallel to each other, will enter the eye from the same direction and therefore, will be focused at the same point on the retina. This will cause a mix of color from adjacent, but different parts of the display. This will result in blur and loss of resolution. In order to prevent this, the optical axes of all the cells that image the whole display need to point to the center of the pupil of the eye rather than being parallel to each other. In other words, the centers of each pair of cell lenses and the center of the pupil of the eye have to be on the same line over all the area of the display.

This is achieved in the following way:
Assume:
a. The eye of the observer is located on the chief axis (the vertical line that comes out of the center of the display).
b. The centers of the lenses on both sides of the central cell are also located on this chief axis (see FIG. 4a).
c. The inner size of the cell is Dc1 and the outer size of the cell is Dc2.
d. A small area of the display with the coordinates (X,Y) from the center (0,0) is imaged onto the eye of the observer through each MLA cell.

Then, the requirement for the optical axes of the eye and those of the two relevant cell lenses, to lie on a straight line, results in the requirement that the center of the inner lens is slightly higher (or lower) from the chief axis then the height of the outer lens (see FIG. 4, 4a).

Using equivalent triangles relations, we get: Y1/Y2=(L−H)/(L−H−H1). Then the required vertical offset (OSy), between the centers of a certain cell at a distance of Y from the chief axis is: OSy=Y1−Y2=Y*H1/L.

Let Ny=Y/Dc2 be the approximate number of outer lenses 135, that lie between the center of the display and Y then, OSy=(Y/Dc2)*Dc2*H1/L then OSy=Ny*Dc2*H1/L.

Multiplying that number of lenses (Ny) by the difference in their size (Dc1−Dc2) is equal to the total offset between the lenses at the height Y from the center: OSy=Ny*(Dc1−Dc2). Substituting OS from above we get Ny*(Dc1−Dc2)= Ny*Dc2*H1/L then Dc1−Dc2=Dc2*H1/L. And— Dc1=Dc2*(1+H1/L)

A similar assessment, along the X direction, results in the same requirement. This is the relation between the sizes of the inner and outer cells, so that all the centers of the pairs of lenses of each cell, all over the display, will lie on one optical axis with the eye. Thus, the resolution of the display will be preserved.

First Example a. Dc2=100 μm, H1=1 mm, L=250 mm—then— Dc1=100.4 mm b. For simplicity, in the following discussion we will approximate Dc1 and Dc2 by their average: Dc=(Dc1+Dc2)/2

All the above optical concept is similar for all the pairs of the lenses of the two MLA layers.

The center of the entrance pupil of the eye and the center of each lens of the $2^{nd}$ (outer) MLA, constitute an optical axis along which the above described, portion of the display (a square of size D) is imaged at the retina as an unresolvable spot at the proper color of that region of the display.

The optical axis of the eye and adjacent lenses of the outer MLA form optical axes that are at slightly different direction thus, the ensemble of the images of all the spots on the retina of the eye form a perfect imaged replica of the whole display on the retina.

The appearance of the display is not expected to be sensitive to the viewing angle (relative to the perpendicular to the display).

The resolving element of the image on the retina of the eye is D and as indicated above, its size is D=Dc/M. As M=H/H, three cases may be analyzed:

a. Assuming H1=H, M=1 and D=Dc. In this case, the resolving element is of the size of the cell of the MLA (Dc) and as long as this is kept well below the resolving power of the eye, the resolution of the displayed image will be preserved. Light rays from the MLA that enter the observer's eye are very close to parallel therefore, there is no significant changes in the apparent brightness of the display.

b. Assuming H1<H, M<1 and D>Dc. In this case, the imaged regions of adjacent lenses of the MLA may partly overlap thus, the resolving element is ~D. By minimizing the size of H1, this case may be utilized for practical reasons, to avoid a too thick MLA element above the display. Also, by partly blending the images of adjacent cells, the risk of aliasing and Moiré artifacts is minimized. Also, the apparent brightness of the display is preserved due to the compensating effect of the larger area of the source (D) that is imaged on the retina and the larger solid angle of the light emitted from the MLA by the same amount. As long as D is kept well below the resolving power of the eye, the resolution of the displayed image will be preserved.

c. Assuming H1>H, M>1 and D<Dc. In this case, there are un-imaged gaps between the cells. This may result in a loss of display brightness as well as a higher thickness of the MLA and a higher risk of aliasing and Moiré therefore, this case is undesirable.

In summary, the resolution of the display will be preserved as long as D is kept below the resolving power of the eye.

Moreover, as will be detailed in some examples below, if the eye of the observer lost its autofocus capability (as for example, with elderly people that require reading glasses) and is fixed focused at a different distance than infinity, the image of the display on the retina of the eye will still be perfect due to the fact that it will draw the image from a plane that is in close proximity, within the depth of focus (in the range of nanometers . . . ) of the focal plane of the outer lens (see FIGS. 4 and 5). In FIG. 4 we refer to one cell of the lens array of FIG. 1.

The sub pixels 104 are blended on lens 120 to become a colored spot, where the intensity of the spot and its color are almost the same along the optical axis, in the proximity of the plane of the lens 120 and is noted as planes 121-126.

Planes 121-126 are examples of different plains that differ from each other and are located at a vicinity of focal planes of a second microlenses of the second array of second microlenses. Each plane of 121-126 bears visual information that represents the visual information displayed by the display—but is not an image of the display. The planes are close to each other—for example within a micron scale or sub-millimeter distance. The visual information has segments—each segments passes through a pair that include a first microlens and a second microlens.

The eye of user A, who is fixed focused at Infinity, gets its image from the focal plane 530 of the $2^{nd}$ lens. This image is projected to infinity by the $2^{nd}$ lens 135 and the lens of the user's eye 510 focuses it onto its retina 515.

Figure 5:
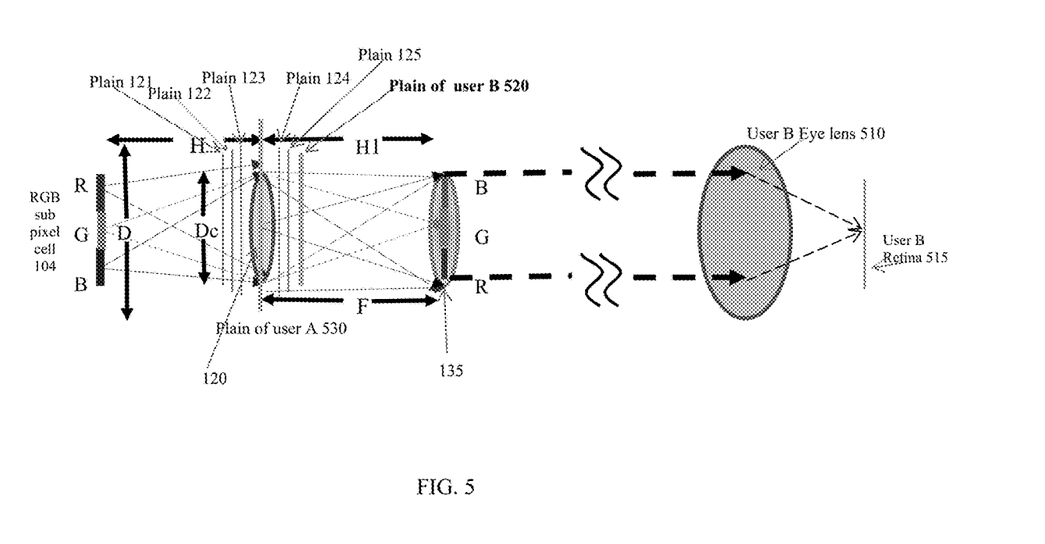

In FIG. 5 we refer to the case where the user is fixed focuses at a close range ("short sighted"). In this case, his eye will receive its sharp image from plane 520 that is slightly closer to lens 135 and in front of lens 120. The image of this plane is sharp on the retina 515.

As can be seen, even at a slightly displaced plane, along the optical axis, the image of each cell contains a color that is still an excellent representation of the color of that portion of the display (see 104 in FIGS. 1 and 3) which represent the color spot around the lens 120. Thus, this invention presents a solution that eliminates the requirement for reading glasses with any prescription correction in diopters, even in the cases that both eyes need different corrections. It should be noted that one can use only part of the above-mentioned layers or to organize them in a different order as well as to add more layers or combine the layers into one layer.

The method and apparatus may also reduce the effect of reflection of ambient light. As described above, in FIGS. 1 and 3 the outer surface is composed of an array of microlenses 135, each of them below the resolution of the eye. This surface acts as a perfect diffuser for the very bright image of the vicinity, scatters it away and prevent it from interfering with the displayed image as the current situation is. Although the outer surface is a perfect diffuser, it allows the viewer to perfectly see through it the display with even no need for reading glasses.

This AIDMLA proposed imaging system is robust and insensitive to minor changes in the thicknesses of the layers and the glass. As will be evident from the examples below.

The system is also insensitive to minor in-corrections in the radii of the lenses, their shapes and surfaces. Due to the small size of its optical elements (of the order of magnitude of the display pixel pitch), below the resolving power of the perfect eye the proposed invention eliminates the requirements for corrections of possible optical aberrations (chromatic, spherical, comma, etc. . . . ) of its optical elements. This feature of the invention assures low prices of its development and production.

AIDMLA example and analysis (M=1).

Example A: Short Sighted Eye Focused at 0.5 m a. Following is a short reasoning and calculations:
b. Assume that the system is composed of the following subsystems:
c. A 1000 μm thick cover glass, a 100 μm PET base, a $1^{st}$ MLA made of UV Resin A and a $2^{nd}$ MLA made of UV Resin B:
d. Note: for simplicity, we use the optical thickness (thickness divided by the refractive index) of the flat elements (cover glass, base, adhesive, etc. . . . ).
e. The minimal distance of the $1^{st}$ lens from the display is the thickness of the glass: 1000 μm+100 μm (PET base)+100 μm UVRA (UV Resin A) and 2f=1200 μm, then f=600 μm is the focal length of the $1^{st}$ lens.
f. The radius of the $1^{st}$ lens will be: R1=f*(n2−n1)=600* (1.62−1.52)=60 μm. If air gap 131 is used as seen in FIG. 3
g. R=f*(1.52−1)=600*0.52=312 μm.
h. The $2^{nd}$ layer will have a thickness and focal length of F=2f=1200 μm
i. We may use the same UVRA for the outer layer.
j. In this case, R2=F*(1.52−1)=1200*0.52=624 μm.
k. Total foil thickness: 100(PET)+100(UVRA)+1200=1.4 mm Sensitivity to the amount of required correction of the eyesight:

Assume an eye that is fixedly corrected to a 0.5 m distance and the display is viewed from 0.25 m. That means that the image is imaginary at U=0.25 m from the $2^{nd}$ (projecting) lens. By using the Newtonian lens equation, we find that the object plane is nearer to the lens than its focal plane by the amount of $$x = \frac{F^2}{U} = 624^2 / 250000 = 1.56 \mu m.$$

see FIGS. 4 and 5

At the worst-case scenario, we assume that the RGB different sub-pixel colors are aligned along a line that occupies the size of the whole cell thus, the maximal distance between the R and the B colors is Dc. From each point, the cone of light strikes the $1^{st}$ lens 125 at a slightly different angle see FIGS. 4 and 5. At the plane of the lens 120, the colored cones overlap and perform a perfect blend. When we move from that plane by a distance x along the optical axis, to the plane that utilizes the sharpest image of the above mentioned un-corrected eye, there is a slight separation of the cross sections of the RGB cones that might cause a slight change in the color of that cell. See FIG. 5. From simple geometry we may find that the maximal relative separation −S between the two R and B color cones cross sections is S=x/F where F is the focal length of the $2^{nd}$ (outer) lens.

Substituting for x from the equation above we get S=F/U. In our case we get S=624/250000 S=0.0025=0.25%. This worst-case separation is an order of magnitude smaller, than the limit of a noticeable change in color (3%). Hence as noted in FIGS. 4 and 5, the color of 104 around plane 530 is almost the same.

This also means that errors of the order of 10-15 μm (~10*x) in focal lengths and layer thicknesses are also tolerated thus, the system is robust and manufacturable.

Second Example

Assume the system is similar to the above but now, the imaginary image should be at a distance U=2.25 m−0.25 m=2 m from the display.

Substituting in the above equation we get $$x = \frac{F^2}{U} = 624^2 / 2000000 = 0.19$$

μm and a maximal color separation of S=624/ 2000000=0.03% which is even two orders of magnitude below the noticeable change in color (3%).

AIDMLA example and analysis (M=0.5)
a. Following the methodology of the above calculations, one may also show that for a smaller magnification such as M=0.5 we get f=300 μm and a total foil thickness of 100(PET)+100(UVRA)+600=0.8 mm. This lower thickness may be easier to handle as a glass protector of the display or as an integrated inner part of the display. The rest of the features will be similar as explained in the above examples.

In summary, the proposed AIDMLA offers the following important features and advantages—resolution and no need for diopter correction of the eyes of the observer.

The resolution is determined by the cell size and magnification.

As the eye is at a relatively long distance compared to the size of the cell, each cell determines its line of sight to the eye and as the size of the cell is below the human resolution the original resolution of the display is preserved. From a viewing distance of 25 cm, the resolving element of the perfect eye is >90 μm.

This resolution is similar at a wide range of angles. As the line of sight moves from the perpendicular of the display, part of the light may come from adjacent inner lenses but as they are identical, the resolution and color of the display will not change.

Each type of eye will see the sharp image of a slightly different object plane of the outer MLA (135) but, as explained above, the color of the display will not change noticeably.

FIG. 1 is a cross section of one of the rows in FIG. 2. It should be noted that FIG. 2 presents the upper view of the array of elements and each element is a 3D element with dimension Dc×Dc. Typical values of Dc, may be on the scale of micrometers. In some cases, for large displays such as Televisions, Dc can be also in the range of mm. Dc may be on the order of the pixel pitch to maintain the resolution of the display but somewhat different, in order to avoid possible Moiré artifacts.

As an example for multi-layer approach, we use a layer that is composed of an array of rectangular micro-elements as described in FIG. 2. It should be noted that any shape that can fully cover the display area can be considered, such as an array of triangles, rectangles, hexagonal etc. Other geometrical shapes may also be applied (circles, etc. . . . ) but they will have dead spaces between the elements and will therefore have, a lower transmission efficiency of the energy of the display. In FIGS. 1 and 2, we show the rectangular case, each element of size d1*d2 and height H1 consists of transparent element 130. Preferably, the dimensions of d1 and d2 are below the resolution of the eye Layer 135 has two functionalities:
  a. To re-collimate the rays from a plane in which lens 120 is positioned to parallel rays that enter the eye of the observer and produce an image of the plane in which lens 120 is positioned at Infinity.
  b. Due to the repetitive, possible convex or concave outer elements of pitch of approximately the pitch of the display pixels (below the resolution of the eye), it acts also as matte surface and diffuses the incoming ambient light, and will become resistant to scratches and fingerprint marks.

It should be noted that one can combine these layers in different ways or to use parts of these layers. This structure of layers is provided as an example of how the system and method can be implemented. The method presented can be embedded as a special layer 150 inside the display of the device or can be used as an add-on transparent element that covers the display.

FIG. 6 presents an example of how the AIDMLA may be embedded in the phone. There are various options to do so. We present an example where our apparatus 150 is located between the display and below the cover glass. The digital display 105 is composed of a combination of arrays of R, G, B color sub pixels 104 where the combination of the three subpixels represents the color of a pixel. It should be noted that different configuration of the color subpixel can be used, this arrangement is used as an example. In today mobile phone the pitch is around 40-80 um. The array of pixels is attached to our thin layer element 150 of FIG. 6. The cover glass 110 is attached to 150.

Apparatus 150 is composed as an example, of 4 layers as follows:
  a. Layer 115 which may consist of a transparent spacer as well as an index matching glue between the display and the lens array layer 120.
  b. A micro lens array layer 120, each lens with a square aperture of Dc1 and focal length f1.
  c. Intermediate transparent layer 130.
  d. A second lens array layer 135 with a square aperture of width Dc2 and a focal length f2 that resides on layer 130, this layer re-collimates the rays and images plane 125 to the eye of the observer at Infinity or at the desired image distance that is suitable to the user eye 137.

The micro-lens array 135 has its focus f2 equal to H1 which ensures that the plane 125, at the center of lens 120 is projected to infinity. Given H and H1, the focal length f1 of 120 is chosen to image the display 105 onto the outer MLA 135 with a magnification of M=H1/H.

Figure 7:
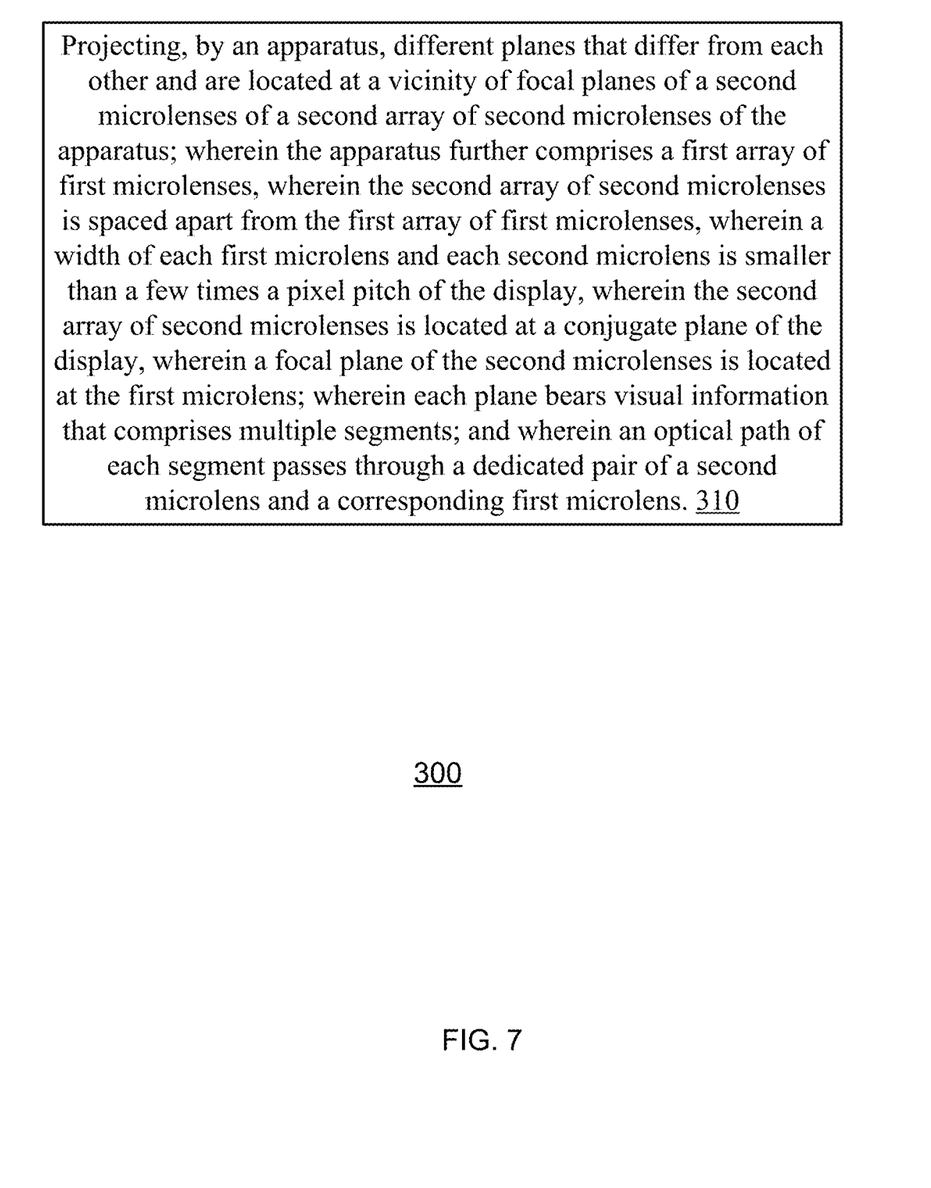
FIG. 7 is an example of a method.

FIG. 7 illustrates method 300. Method 300 may include step 310 of projecting, by an apparatus, different planes that differ from each other and are located at a vicinity of focal planes of a second microlenses of a second array of second microlenses of the apparatus; wherein the apparatus further comprises a first array of first microlenses, wherein the second array of second microlenses is spaced apart from the first array of first microlenses, wherein a width of each first microlens and each second microlens is smaller than a few times a pixel pitch of the display, wherein the second array of second microlenses is located at a conjugate plane of the display, wherein a focal plane of the second microlenses is located at the first microlens; wherein each plane bears visual information that comprises multiple segments; and wherein an optical path of each segment passes through a dedicated pair of a second microlens and a corresponding first microlens.

The apparatus may be added to the display, integrated with the display, may be an add-on to the display, and the like.

In the detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to an apparatus capable of executing the method.

Any reference in the specification to an apparatus should be applied mutatis mutandis to a method that may be executed by the apparatus.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to an apparatus as including a certain component should also cover the scenario in which the apparatus does not include the certain component.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the apparatus and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of apparatus that is illustrated in any of the figures and/or specification and/or the claims may be provided.

Any combination of any apparatus illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An apparatus for projecting content displayed on a display, the apparatus comprises:
    a first array of first microlenses that comprise multiple first microlenses;
    a second array of second microlenses that is spaced apart from the first array of first microlenses and comprises multiple second microlenses;
    wherein a width of each first microlens and each second microlens is smaller than four times a pixel pitch of the display;
    wherein the second array of second microlenses is located at a conjugate plane of the display; wherein a focal plane of the second microlenses is located at the first microlens;
    wherein the apparatus is configured to project visual information borne in each virtual plane of different virtual planes that are planar, are parallel to each other, are spaced apart from each other and are located at a vicinity of a focal plane of the second microlenses;
    wherein visual information borne in each virtual plane comprises multiple segments; and
    wherein optical paths of different segments pass through different pairs of microlenses, wherein each pair of microlenses comprises a second microlens and a corresponding first microlens.

2. The apparatus according to claim 1 wherein the visual information borne in each virtual plane represents visual information that is displayed by the display and differs from an image of the display.

3. The apparatus according to claim 1 wherein the different virtual planes are located inside a depth of field of the second array of second microlenses.

4. The apparatus according to claim 1 wherein two or more pairs of microlenses of the different pairs of microlenses have optical axes that are not parallel to each other.

5. The apparatus according to claim 1 wherein a distance between adjacent second microlenses is smaller than a distance between corresponding adjacent first microlenses.

6. The apparatus according to claim 1 wherein two or more pairs of microlenses of the different pairs of microlenses exhibit optical axes that intersect each other.

7. The apparatus according to claim 1 wherein an area of a second microlens is smaller than an area of a corresponding first microlens.

8. The apparatus according to claim 1 wherein a ratio between a width (Dc2) of a second microlens and a width (Dc1) of a corresponding first microlens substantially equals L/(L+H1), wherein H1 is a distance between the second microlens and the first corresponding microlens, and wherein L is distance between the display and an intersection point between optical axes of two or more pairs of microlenses of the different pairs of microlenses.

9. The apparatus according to claim 8 wherein there is an air gap between the at least one transparent element and the first microlenses arrays.

10. The apparatus according to claim 1 further comprising at least one transparent element positioned between the first microlenses array and the second microlenses array.

11. A method for projecting content displayed on a display, the method comprises:
projecting, by an apparatus, visual information borne in each virtual plane of different virtual planes that are planar, are parallel to each other, are spaced apart from each other and are located at a vicinity of a focal plane of the second microlenses;
wherein the apparatus further comprises a first array of first microlenses, wherein the second array of second microlenses is spaced apart from the first array of first microlenses,
wherein a width of each first microlens and each second microlens is smaller than four times a pixel pitch of the display,
wherein the second array of second microlenses is located at a conjugate plane of the display,
wherein a focal plane of the second microlenses is located at the first microlens;
wherein visual information borne in each virtual plane comprises multiple segments; and
wherein optical paths of different segments pass through different pairs of microlenses, wherein each pair of microlenses comprises a second microlens and a corresponding first microlens.

12. The method according to claim 11 wherein the visual information borne in each virtual plane represents visual information that is displayed by the display and differs from an image of the display.

13. The method according to claim 11 two or more pairs of microlenses of the different pairs of microlenses have optical axes that are not parallel to each other.

14. The method according to claim 11 wherein a distance between adjacent second microlenses is smaller than a distance between corresponding adjacent first microlenses.

15. The method according to claim 11 wherein two or more pairs of microlenses of the different pairs of microlenses exhibit optical axes that intersect each other.

16. The method according to claim 11 wherein an area of a second microlens is smaller than an area of a corresponding first microlens.

17. The method according to claim 11 wherein a ratio between a width (Dc2) of a second microlens and a width (Dc1) of a corresponding first microlens substantially equals L/(L+H1), wherein H1 is a distance between the second microlens and the first corresponding micro lens, and wherein L is a distance between the display and an intersection point between optical axes of two or more pairs of microlenses of the different pairs of microlenses.

18. The method according to claim 11 wherein the apparatus further comprises at least one transparent element positioned between the first microlenses array and the second microlenses array.

19. The apparatus according to claim 18 wherein there is an air gap between the at least one transparent element and the first microlenses arrays.

* * * * *